(12) United States Patent
Dahl et al.

(10) Patent No.: US 12,373,175 B2
(45) Date of Patent: *Jul. 29, 2025

(54) APPLICATION DEPENDENCY VISUALIZATION

(71) Applicant: Bank of America Corporation, Charlotte, NC (US)

(72) Inventors: Erik Dahl, Newark, DE (US); Pratap Dande, Saint Johns, FL (US); Rahul Yaksh, Austin, TX (US); Vishwanath Prasad Karra, McKinney, TX (US); Steven Allan Reich, Manalapan, NJ (US); Tileshia Brenda Alford, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 363 days.

This patent is subject to a terminal disclaimer.

(21) Appl. No.: 18/063,765

(22) Filed: Dec. 9, 2022

(65) Prior Publication Data

US 2024/0192931 A1 Jun. 13, 2024

(51) Int. Cl.
*G06F 9/44* (2018.01)
*G06F 8/36* (2018.01)

(52) U.S. Cl.
CPC .................. *G06F 8/36* (2013.01)

(58) Field of Classification Search
None
See application file for complete search history.

(56) References Cited

U.S. PATENT DOCUMENTS

| | | | |
|---|---|---|---|
| 9,535,726 B2 | 1/2017 | Lagerblad et al. | |
| 9,910,663 B1* | 3/2018 | Biear | G06F 8/65 |
| 10,719,188 B2 | 7/2020 | Sanches et al. | |
| 11,144,862 B1* | 10/2021 | Jackson | H04L 65/65 |
| 12,231,307 B2* | 2/2025 | Madani | G06F 21/552 |
| 2015/0052441 A1* | 2/2015 | Degioanni | G06F 11/323 |
| | | | 715/734 |
| 2016/0261459 A1* | 9/2016 | Kamath | G06F 8/60 |
| 2016/0359697 A1* | 12/2016 | Scheib | G06F 16/288 |
| 2016/0359705 A1* | 12/2016 | Parandehgheibi | G06F 16/1744 |
| 2019/0327154 A1* | 10/2019 | Sahoo | G06F 11/3476 |
| 2020/0110583 A1* | 4/2020 | Harrison | G06F 8/34 |

FOREIGN PATENT DOCUMENTS

| | | | |
|---|---|---|---|
| CN | 110347954 | * | 10/2019 |
| CN | 114968341 A | * | 8/2022 |

* cited by examiner

*Primary Examiner* — Insun Kang
(74) *Attorney, Agent, or Firm* — Banner & Witcoff, Ltd.

(57) ABSTRACT

An application mapping engine may determine dependencies in existing executable application by monitoring and analyzing process flow and data flow of the application during runtime execution. The application mapping engine may generate dependency visualization maps that illustrate dependency interaction information.

21 Claims, 10 Drawing Sheets

APPLICATION DEPENDENCY VISUALIZATION

FIELD

Aspects described herein generally relate to computer systems and networks. More specifically, aspects of this disclosure relate to mapping of application dependencies and visually displaying those dependencies.

BACKGROUND

Organizations may utilize hundreds or thousands of applications to conduct daily business transactions. These applications have many dependencies between each other that are extremely difficult to visualize. There is no common format, style, or system of record for application dependency diagrams for business services. As a result, diagrams are created in various formats, stored in multiple locations, are rarely updated, and almost always have to be redrawn from scratch in response to regulatory or executive requests.

The redrawing of dependency maps is time consuming and wasteful of system resources. Additionally, the current state presents risks of sharing or communicating out of date information, and requires error-prone interpretation of different diagram styles by different users or teams. There is a need to develop a system to generate and update application interface maps that removes wasteful resources and provides a common mapping style across an organization to enable rapid exchange and interpretation of information.

SUMMARY

Aspects of the disclosure provide solutions that address and overcome technical problems associated with generating visual representations of interactions and/or dependencies between applications. The architecture may comprise application components (e.g., logic, functions, etc.), infrastructure components (e.g., computing and/or network services), and/or interconnections. As an application evolves over time, the dependencies between applications change and such changes need to be captured and documented.

Various aspects of this disclosure relate to devices, systems, and methods for mapping of application dependencies. An application mapping engine may determine dependencies in existing executable application by monitoring and analyzing process flow and data flow of the application during runtime execution. The application mapping engine may generate a dependency visualization map that leverages dependency interaction information along with existing sources of dependency information. The generated dependency visualization maps may be modified, annotated, and/or saved for further study. The system may include performing machine learning based on the generated visualization maps and the monitored process and data flow through the applications.

BRIEF DESCRIPTION OF THE DRAWINGS

The present disclosure is illustrated by way of example and not limited in the accompanying figures in which like reference numerals indicate similar elements.

DETAILED DESCRIPTION

In the following description of various illustrations, reference is made to the accompanying drawings, which form a part hereof, and in which is shown, by way of illustration, various examples in which aspects of the disclosure may be practiced. It is to be understood that other examples may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Various aspects of this disclosure relate to devices, systems, and methods for mapping of application dependencies. An application mapping engine may determine dependencies in existing executable application by monitoring and analyzing process flow and data flow of the application during runtime execution. The application mapping engine may generate a dependency visualization map that leverages dependency interaction information along with existing sources of dependency information (service enablers, server dependencies, information flows, product scans, application records etc.). The generated dependency visualization maps may be modified, annotated, and/or saved for further study. The system may include performing machine learning based on the generated visualization maps and the monitored process and data flow through the applications.

Figure 1:
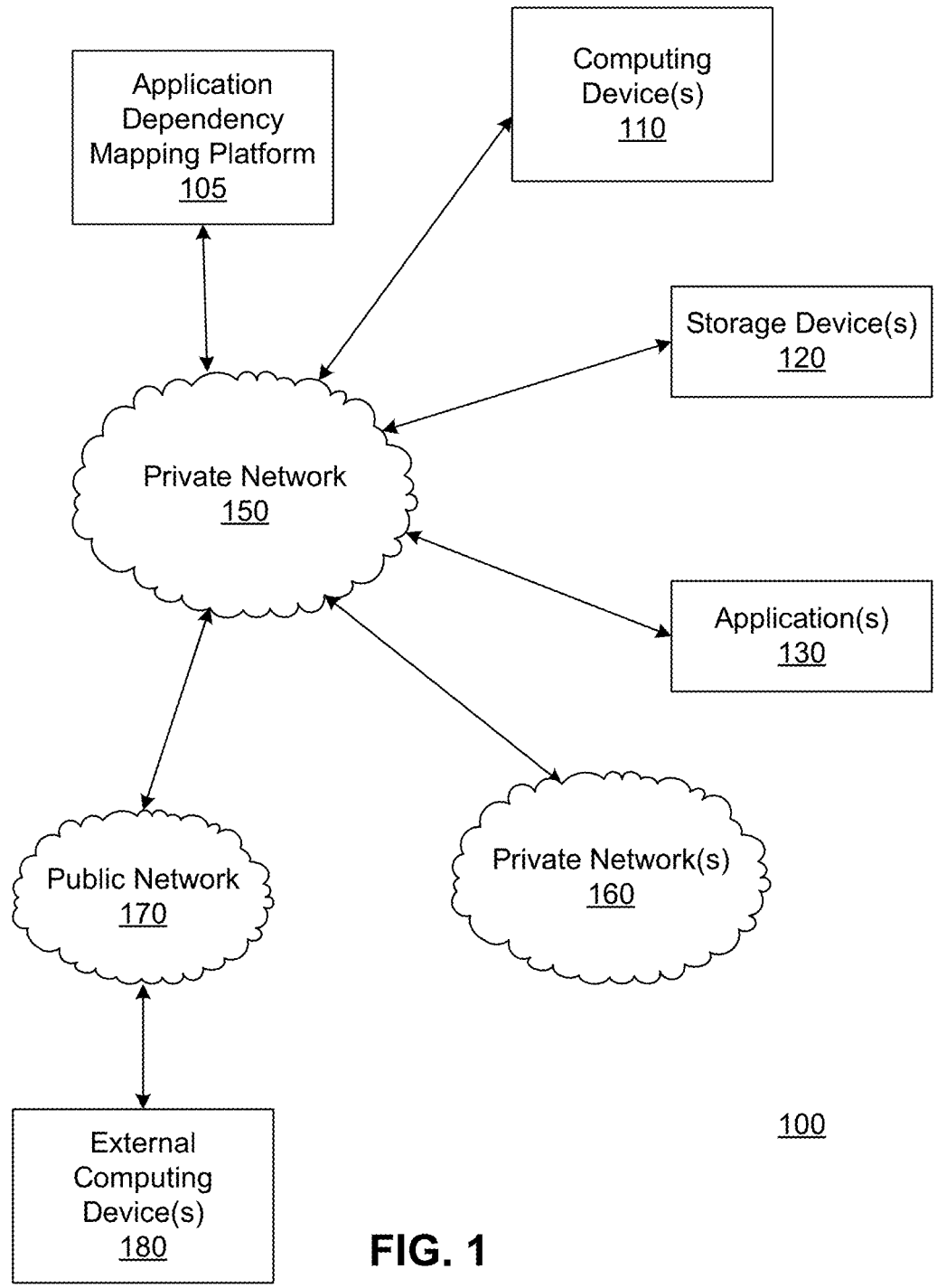
FIGS. 1 and 2 depict an illustrative computing environment for application dependency mapping of executable applications, in accordance with one or more example arrangements.
Figure 2:
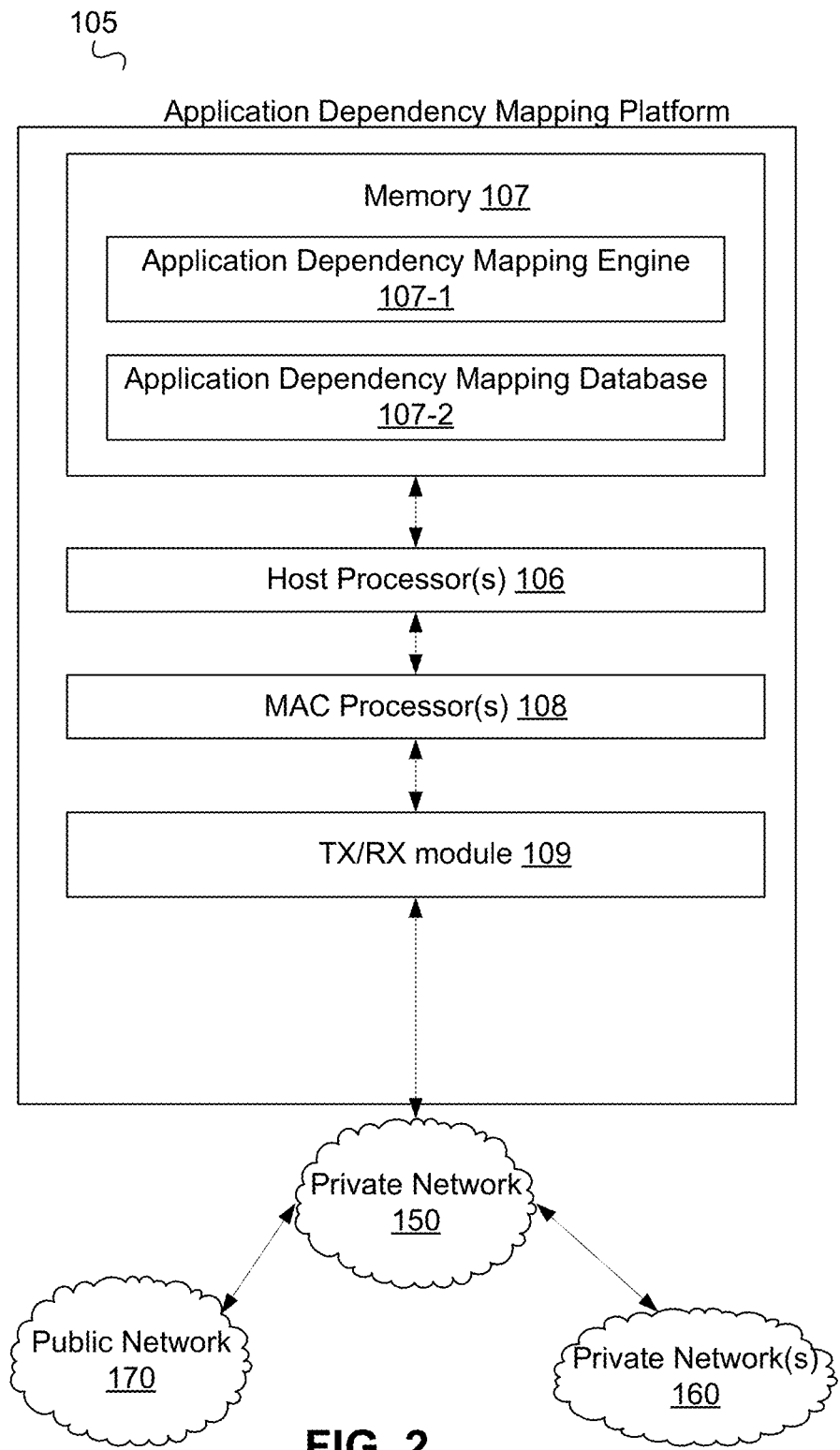

FIGS. 1 and 2 depict an illustrative computing environment for application dependency mapping of executable applications, in accordance with one or more example arrangements. Referring to FIG. 1, a computing environment 100 may comprise one or more devices (e.g., computer systems, communication devices, servers). The computing environment 100 may comprise, for example, an application dependency mapping platform 105, computing device(s) 110, and storage device(s) 120 linked over a private network 150. The storage device(s) 120 may comprise a database, for example, a relational database (e.g., Relational Database Management System (RDBMS), Structured Query Language (SQL), etc.). Application(s) 130 may operate on one or more computing devices or servers associated with the private network 150. The private network 150 may comprise an enterprise private network, for example.

The computing environment 100 may comprise one or more networks (e.g., public networks and/or private networks), which may interconnect with the application dependency mapping platform 105, the computing device(s) 110, the storage device(s) 120, and/or one or more other devices and servers. One or more applications 130 may operate on one or more devices in the computing environment. The networks may use wired and/or wireless communication protocols. The private network 150 may be associated with, for example, an enterprise organization. The private network 150 may interconnect the application dependency mapping platform 105, the computing device(s) 110, the storage device(s) 120, and/or one or more other devices/servers which may be associated with the enterprise organization. The private network 150 may be linked to other private network(s) 160 and/or a public network 170. The public network 170 may comprise the Internet and/or a cloud network. The private network 150 and the private network(s) 160 may correspond to, for example, a local area network (LAN), a wide area network (WAN), a peer-to-peer network, or the like.

A user in a context of the computing environment 100 may be, for example, an associated user (e.g., an employee, an affiliate, or the like) of the enterprise organization. An external user may utilize services being provided by the enterprise organization, and access one or more resources located within the private network 150 (e.g., via the public network 170). Users may operate one or more devices in the computing environment 100 to send messages to and/or receive messages from one or more other devices connected to the computing environment 100. An enterprise organization may correspond to any government or private institution, an educational institution, a financial institution, health services provider, retailer, or the like.

As illustrated in greater detail below, the application dependency mapping platform 105 may comprise one or more computing devices configured to perform one or more of the functions described herein. The application dependency mapping platform 105 may comprise, for example, one or more computers (e.g., laptop computers, desktop computers, servers, server blades, or the like).

The computing device(s) 110 may comprise one or more of enterprise application host platforms, an enterprise user computing device, an administrator computing device, and/or other computing devices, platforms, and servers associated with the private network 150. The enterprise application host platform(s) may comprise one or more computing devices and/or other computer components (e.g., processors, memories, communication interfaces). The enterprise application host platform may be configured to host, execute, and/or otherwise provide one or more enterprise applications. The enterprise application host platform(s) may be configured, for example, to host, execute, and/or otherwise provide one or more transaction processing programs, user servicing programs, and/or other programs associated with an enterprise organization. The enterprise application host platform(s) may be configured to provide various enterprise and/or back-office computing functions for an enterprise organization. The enterprise application host platform(s) may comprise various servers and/or databases that store and/or otherwise maintain account information, such as financial/membership account information including account balances, transaction history, account owner information, and/or other information corresponding to one or more users (e.g., external users). The enterprise application host platform(s) may process and/or otherwise execute transactions on specific accounts based on commands and/or other information received from other computer systems comprising the computing environment 100. The enterprise application host platform(s) may transmit and receive data from the application dependency mapping platform 105, and/or to other computer systems in the computing environment 100.

The enterprise user computing device may comprise a personal computing device (e.g., desktop computer, laptop computer) or mobile computing device (e.g., smartphone, tablet). The enterprise user computing device may be linked to and/or operated by a specific enterprise user (e.g., an employee or other affiliate of an enterprise organization).

The administrator computing device may comprise a personal computing device (e.g., desktop computer, laptop computer) or mobile computing device (e.g., smartphone, tablet). The administrator computing device may be linked to and/or operated by an administrative user (e.g., a network administrator of an enterprise organization). The administrator computing device may receive data from the application dependency mapping platform 105, manipulate and/or otherwise process such data, and/or return processed data and/or other data to the application dependency mapping platform 105 and/or to other computer systems in the computing environment 100. The administrator computing device may be configured to control operation of the application dependency mapping platform 105.

The application(s) 130 may comprise transaction processing programs, user servicing programs, and/or other programs associated with an enterprise organization. The application(s) 130 may correspond to applications that provide various enterprise and/or back-office computing functions for an enterprise organization. The application(s) 130 may correspond to applications that facilitate storage, modification, and/or maintenance of account information, such as financial/membership account information including account balances, transaction history, account owner information, and/or other information corresponding to one or more users (e.g., external users). The application(s) 130 may process and/or otherwise execute transactions on specific accounts based on commands and/or other information received from other computer systems comprising the computing environment 100. The application(s) 130 may operate in a distributed manner across multiple computing devices (e.g., the computing device(s) 110) and/or servers, operate on a single computing device and/or server. The application(s) 130 may be used for execution of various operations corresponding to the one or more computing devices (e.g., the computing device(s) 110) and/or servers.

The storage device(s) 120 may comprise various memory devices such as hard disk drives, solid state drives, magnetic tape drives, or other electronically readable memory, and/or the like. The storage device(s) 120 may be used to store data corresponding to operation of one or more applications within the private network 150 (e.g., the application(s) 130), and/or computing devices (e.g., the computing device(s) 110). The storage device(s) 120 may receive data from the application dependency mapping platform 105, store the data, and/or transmit the data to the architecture mapping platform 105 and/or to other computing systems in the computing environment 100.

The architecture of the private network(s) 160 may be similar to an architecture of the private network 150. The private network(s) 160 may correspond to, for example, another enterprise organization that communicates data with the private network 150. The private network 150 may also be linked to the public network 170. The public network 170 may comprise the external computing device(s) 180. The external computer device(s) 180 may include at least one computing device (e.g., desktop computer, laptop computer) or mobile computing device (e.g., smartphone, tablet). The external computer device(s) 180 may be linked to and/or operated by a user (e.g., a client, an affiliate, or an employee) of an enterprise organization associated with the private network 150. The user may interact with one or more enterprise resources while using the external computing device(s) 180 located outside of an enterprise firewall.

The application dependency mapping platform 105, the computing device(s) 110, the external computing device(s) 180, and/or one or more other systems/devices in the computing environment 100 may comprise any type of computing device capable of receiving input via a user interface, and may communicate the received input to one or more other computing devices. The application dependency mapping platform 105, the computing device(s) 110, the external computing device(s) 180, and/or the other systems/devices in the computing environment 100 may, in some instances, comprise server computers, desktop computers, laptop computers, tablet computers, smart phones, wearable devices, or the like that in turn comprise one or more processors, memories, communication interfaces, storage devices, and/or other components. Any and/or all of the application dependency mapping platform 105, the computing device(s) 110, the storage device(s) 120, and/or other systems/devices in the computing environment 100 may be, in some instances, special-purpose computing devices configured to perform specific functions.

Referring to FIG. 2, the application dependency mapping platform 105 may comprise one or more of host processor(s) 106, memory 107, medium access control (MAC) processor(s) 108, transmit/receive (TX/RX) module(s) 109, or the like. One or more data buses may interconnect host processor(s) 106, memory 107, MAC processor(s) 108, and/or TX/RX module(s) 109. The application dependency mapping platform 105 may be implemented using one or more integrated circuits (ICs), software, or a combination thereof, configured to operate as discussed below. The host processor(s) 106 and the MAC processor(s) 108 may be implemented, at least partially, on a single IC or multiple ICs. Memory 107 may be any memory such as a random-access memory (RAM), a read-only memory (ROM), a flash memory, or any other electronically readable memory, or the like.

One or more processors (e.g., the host processor(s) 106, the MAC processor(s) 108, and/or the like) of the application dependency mapping platform 105 may be configured to execute machine readable instructions stored in memory 107. Memory 107 may comprise (i) one or more program modules/engines having instructions that when executed by the one or more processors cause the application dependency mapping platform 105 to perform one or more functions described herein, and/or (ii) one or more databases that may store and/or otherwise maintain information which may be used by the one or more program modules/engines and/or the one or more processors. The one or more program modules/engines and/or databases may be stored by and/or maintained in different memory units of the application dependency mapping platform 105 and/or by different computing devices that may form and/or otherwise make up the application dependency mapping platform 105. For example, memory 107 may have, store, and/or comprise an application dependency mapping engine 107-1, and an application dependency mapping database 107-2. The application dependency mapping engine 107-1 may comprise instructions that direct and/or cause the application dependency mapping platform 105 to perform one or more operations, as discussed in greater detail below. The application dependency mapping database 107-2 may comprise a SQL database, an Oracle database, or another relational database, for example. The application dependency mapping database 107-2 may store information to be used for performing architecture mapping of an application. The application dependency mapping database 107-2 may store information corresponding to the computing device(s) 110, the storage device(s) 120, the application(s) 130, the private networks 150 and 160, the public network 170, and/or the external computing device(s) 180 operating within the computing environment 100 for performing the application dependency mapping of the application. The host processor(s) 106 may use the application dependency mapping database 107-2 to store, identify, and/or retrieve the information to be used for performing application dependency mapping. The application dependency mapping database 107-2 may be updated based on performance of the application dependency mapping, as discussed in greater detail below.

While FIG. 2 illustrates the application dependency mapping platform 105 as being separate from other elements connected in the private network 150, in one or more other arrangements, the application dependency mapping platform 105 may be included in one or more of the computing device(s) 110, and/or other device/servers associated with the private network 150. Elements in the application dependency mapping platform 105 (e.g., host processor(s) 106, memory(s) 107, MAC processor(s) 108, and TX/RX module(s) 109, one or more program modules and/or stored in memory(s) 107) may share hardware and/or software elements with and corresponding to, for example, one or more of the computing device(s) 110, and/or other device/servers associated with the private network 150.

Figure 3:
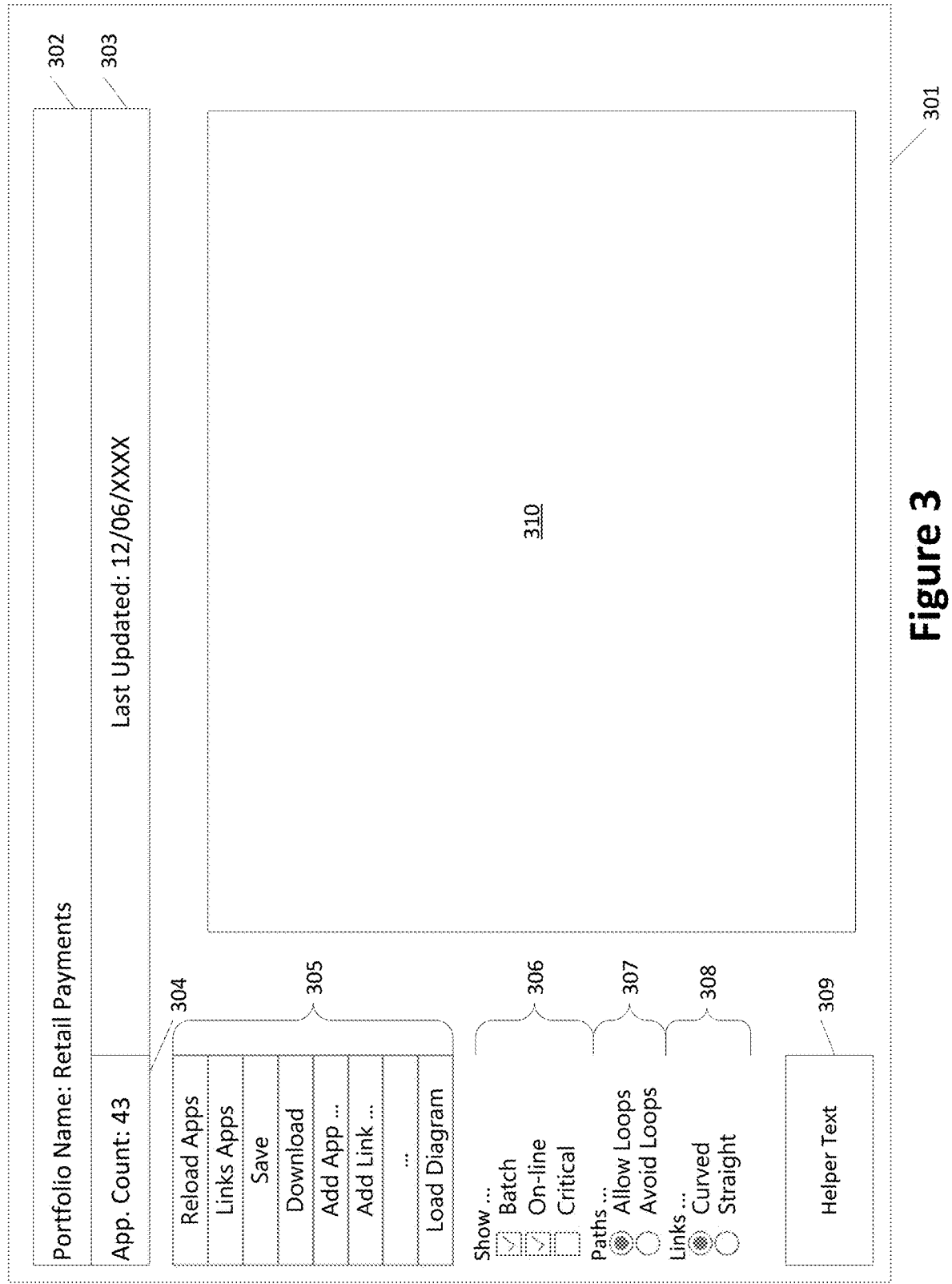
FIG. 3 illustrates an exemplary user interface feature selection background that may be used in accordance with various aspects of the disclosure.

FIG. 3 depicts an exemplary user interface feature selection background 301 that may be used in accordance with various aspects of the disclosure. In an aspect of the disclosure, the exemplary user interface feature selection background 301 may be part of a webpage frame. In an embodiment, user interface controls may be displayed on the left side of user interface feature selection background 301.

In FIG. 3, a retail payments service 302 may be selected for dependency mapping by application dependency mapping platform 105. Application dependency mapping platform 105 may extract data from enterprise database systems and determine application data and information flow data related to retail payments service 302 applications. In an embodiment, the determined application data and information flow data may be analyzed and processed into a JSON data structure. A graphical library may be loaded and executed by application dependency mapping platform 105 for use in rendering a webpage displaying the retail payments service applications and their related dependency mapping.

In an embodiment, application dependency mapping platform 105 may generate an application dependency diagram showing interconnections between applications used in the retail payments service 302. The application dependency mapping diagrams may be displayed in area 310 of user interface feature selection background 301. The user interface feature selection background 301 of FIG. 3 may indicate the last update for the displayed application dependency mapping diagram at 303. Additionally, user interface feature selection background 301 may indicate the number of applications 304 that may be displayed in the mapping diagram for retail payments.

In some arrangements, user interface feature selection background 301 may include a number of diagram controls 305 and a number of visualization controls 306. In an embodiment, diagram controls may include a reload application feature, a link application feature, a save feature, a download feature, an add application feature, an add a link feature, a load diagram feature, and numerous other diagram control features.

User interface feature selection background 301 may also include visualization controls that allow user selection of different types of applications to be displayed in dependency mapping diagrams. For instance, in some arrangements only batch applications may be displayed. In other arrangements, only on-line applications may be displayed. In yet other arrangements, both batch and on-line applications may be displayed. In some arrangements, critical applications may also be displayed and highlighted in application dependency mapping diagrams.

Additional visualization controls may include displaying application loops. The application loops may display all of the dependencies an application has with other applications (i.e. multiple back and forth arrangements). In an embodiment, these loops may be hidden to make the diagram clearer and readable. When not displayed, loop information may still be available by selecting the application to activate drill down menus having detailed information for each application. In some arrangements, user interface feature selection background 301 may also include display link preferences such as using curved lines or straight lines to illustrate application dependencies. User interface feature selection background 301 may also include a help text box 309 which displays useful information for working with application dependency mapping platform 105.

Figure 4:
FIG. 4 illustrates an exemplary application template that may be used in accordance with various aspects of the disclosure.

FIG. 4 illustrates an exemplary application template that may be used in accordance with various aspects of the disclosure. In an embodiment, application template 403 for an application X illustrates an application whose dependency may be shown in relation to a user 401 or associate/agent 402. In some arrangements, application template 403 for application X may include various elements such as an asset identification number 404, a platform type 405, and a recovery tier 406. The asset identification number 404 may allow an organization to track numerous applications across an enterprise. The asset identification number may be a unique number assigned to each application. Platform type 405 for each application may list a location of where an application is found in a hierarchy within an enterprise or organization. For instance, an application may be a middleware application, a desktop application, a mainframe application and/or a third-party application. The recovery tier status 406 of an application may indicate the criticality of an application. For instance, a Tier 0 application may be an application that must always be continuously available for execution. In an embodiment, it may be a requirement for a Tier 0 application to have all dependencies with other applications determined and displayed by application dependency mapping platform 105. In one exemplary instance, applications may have recovery tier designations that range from Tier 0 level to Tier 5.

Figure 5:
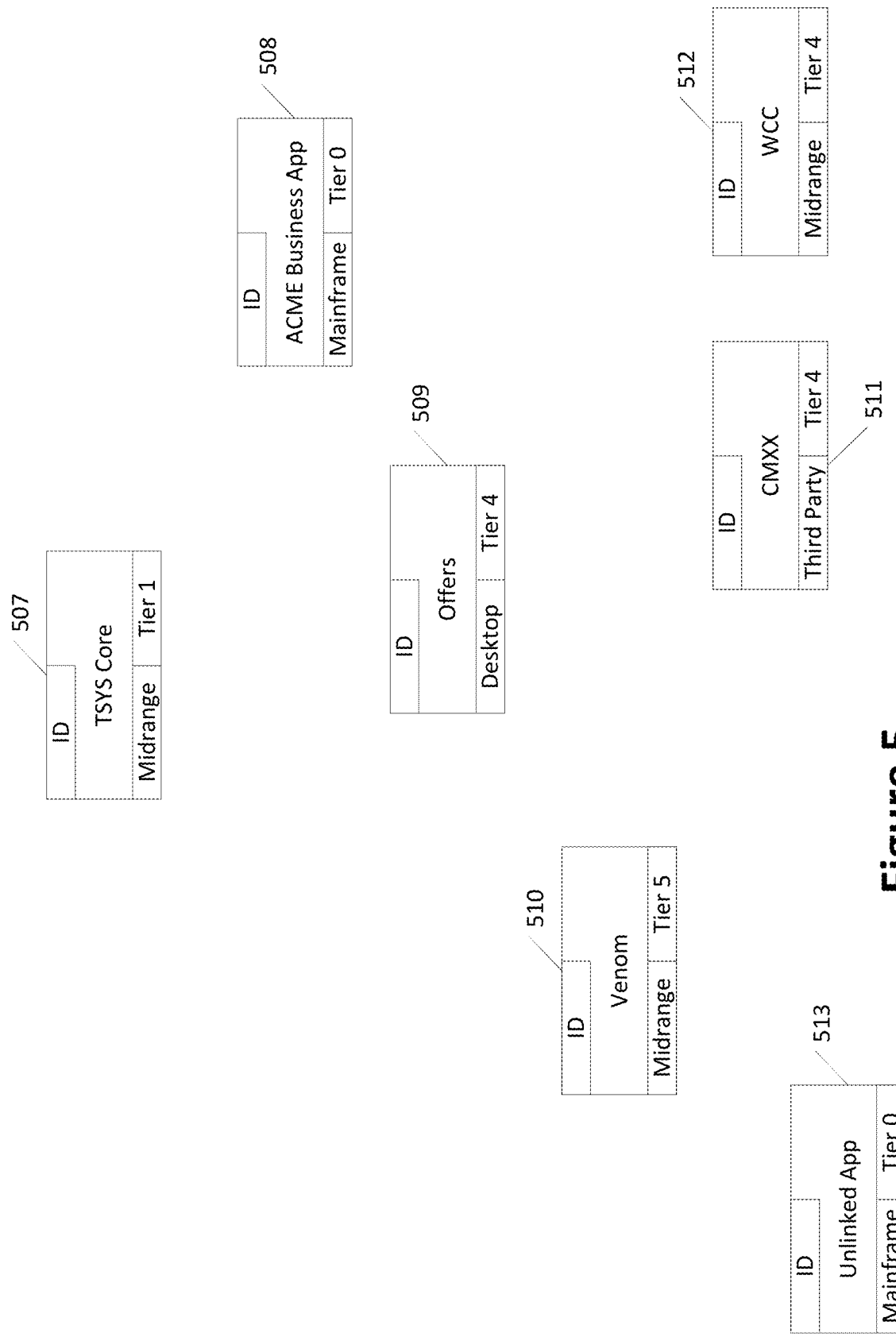
FIG. 5 illustrates additional exemplary application templates that may be used in accordance with various aspects of the disclosure.

FIG. 5 illustrates additional exemplary application templates that may be used in accordance with various aspects of the disclosure. For instance, FIG. 5 illustrates midrange application templates 507, 510, and 512. Application templates 508 and 513 represent mainframe templates. Applications 507 and 512 represent midrange templates. Application 509 illustrates a desktop application. Each of the application templates may provide the applications short description name such as "Venom", "TSYS Core", "ACME Business App", "Offers", "CMXX", and "WCC". In an embodiment, selection of the short description name (or hovering over it) may reveal the full name of the application along with additional application details.

Figure 6:
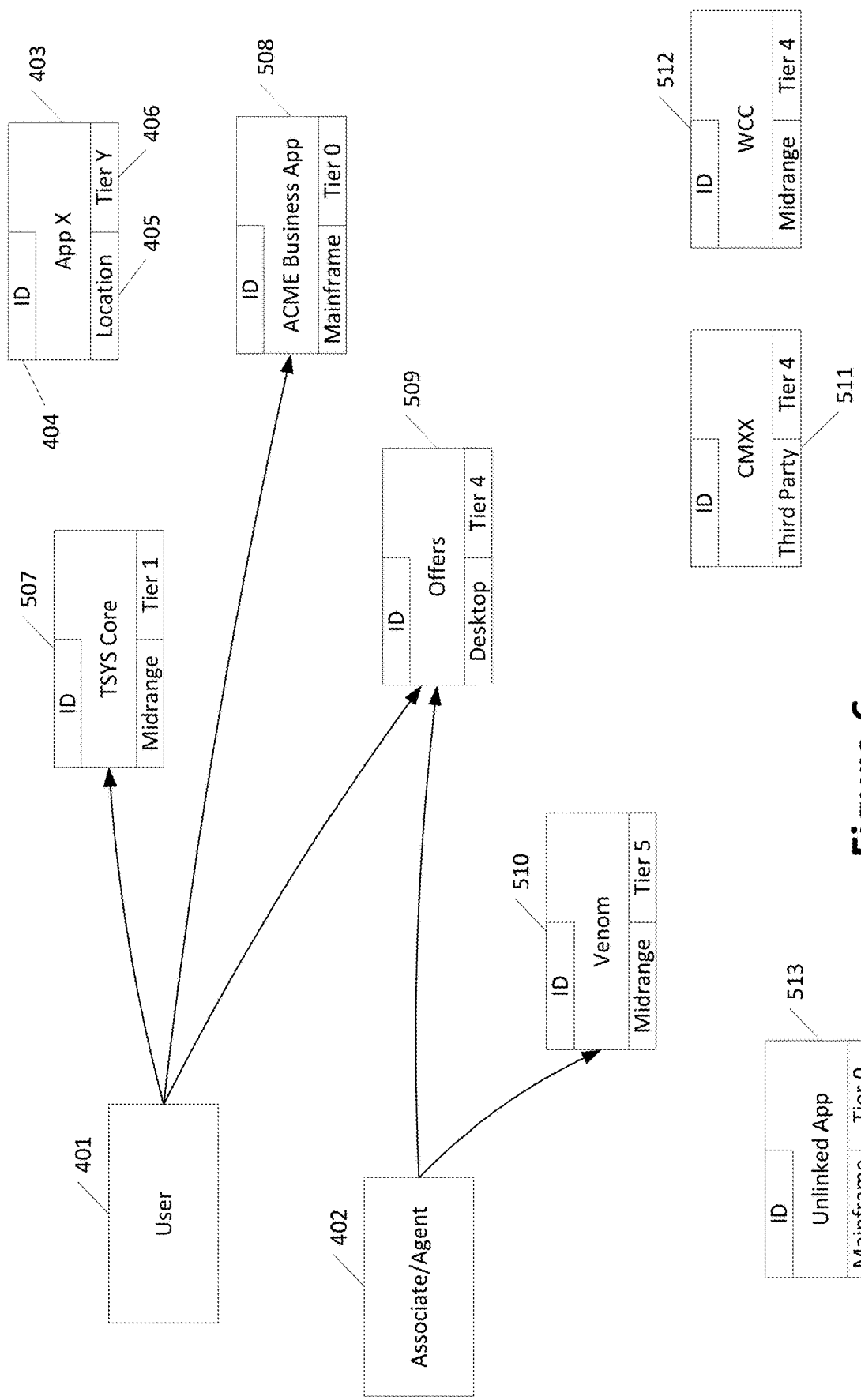
FIG. 6 illustrates exemplary determined application dependencies between users and applications in accordance with various aspects of the disclosure.

FIG. 6 illustrates exemplary determined application dependencies between users and applications in accordance with various aspects of the disclosure. For instance, FIG. 6 illustrates an application dependency between user 601 and "Offers" application template 609. In an aspect of the disclosure, the application templates may be moved or rearranged on the user interface to display alternative layouts based on preferences. For example, dependencies between user 601 and associate/agent 602 may be shown in a left to right progression across area 310 of user interface feature selection background 301. In some arrangements, user 601 and associate/agent 602 may be moved by selecting and dragging their application template boxes to other locations in area 310. Once moved the dependencies may be redrawn on the user interface to account for the relocation.

Figure 7:
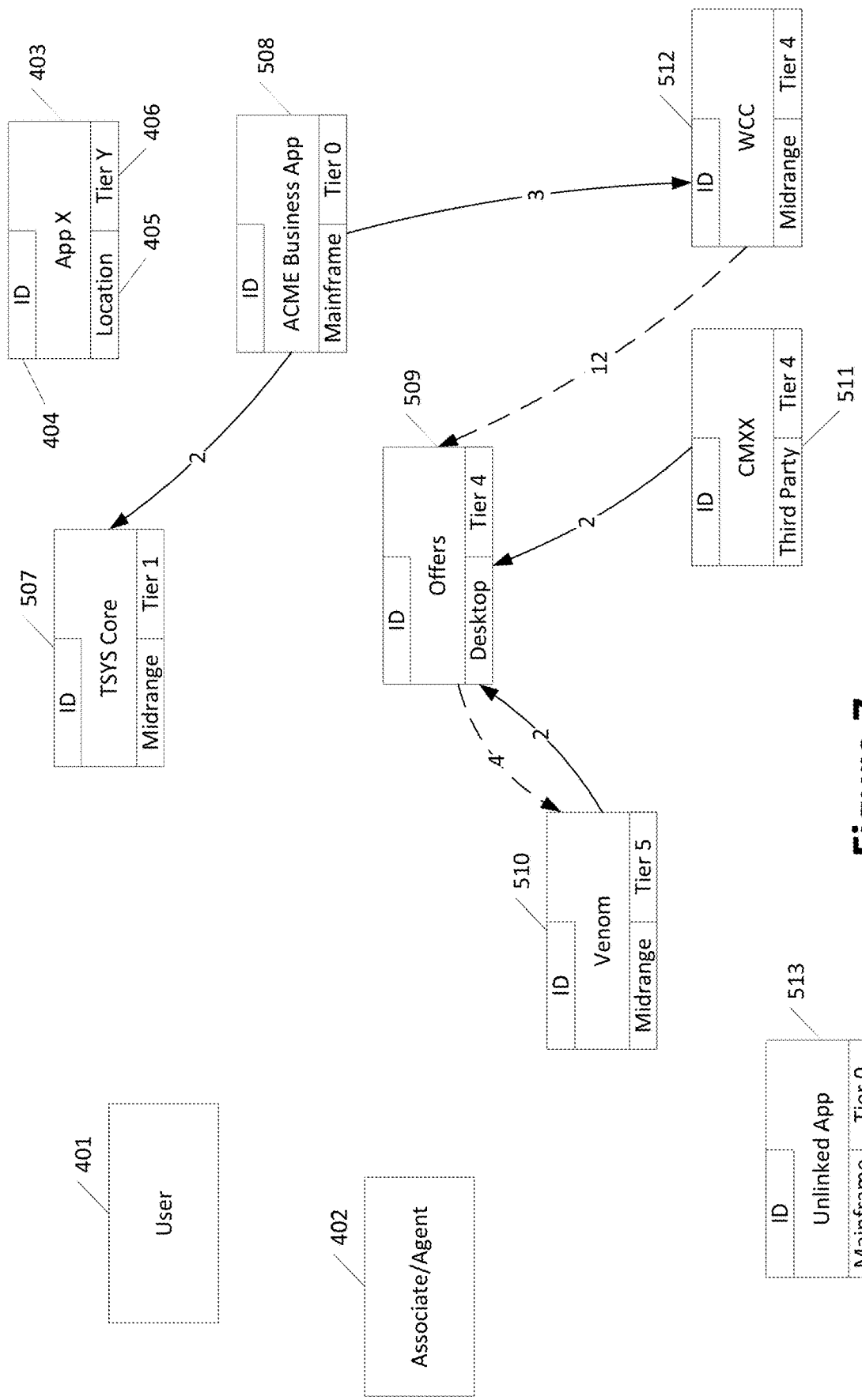
FIG. 7 illustrates exemplary determined application dependencies between applications in accordance with various aspects of the disclosure.

FIG. 7 illustrates exemplary determined application dependencies between applications in accordance with various aspects of the disclosure. For instance, FIG. 7 illustrates an application dependency between application template 708 and application template 707. As shown in FIG. 7 by the line between application template 708 and 707 two dependencies between the applications have been determined. For drawing clarity only one line is displayed on the dependency diagram. Additional information about each of the two dependencies between application template 708 and 707 may be displayed upon selection of the line drawn between application template 708 and 707 (or hovering over it). In some arrangements, dotted lines between application templates may represent batch process dependencies between applications. For instance, FIG. 12 illustrates twelve batch process application dependencies between application templates 712 and 709.

Figure 8:
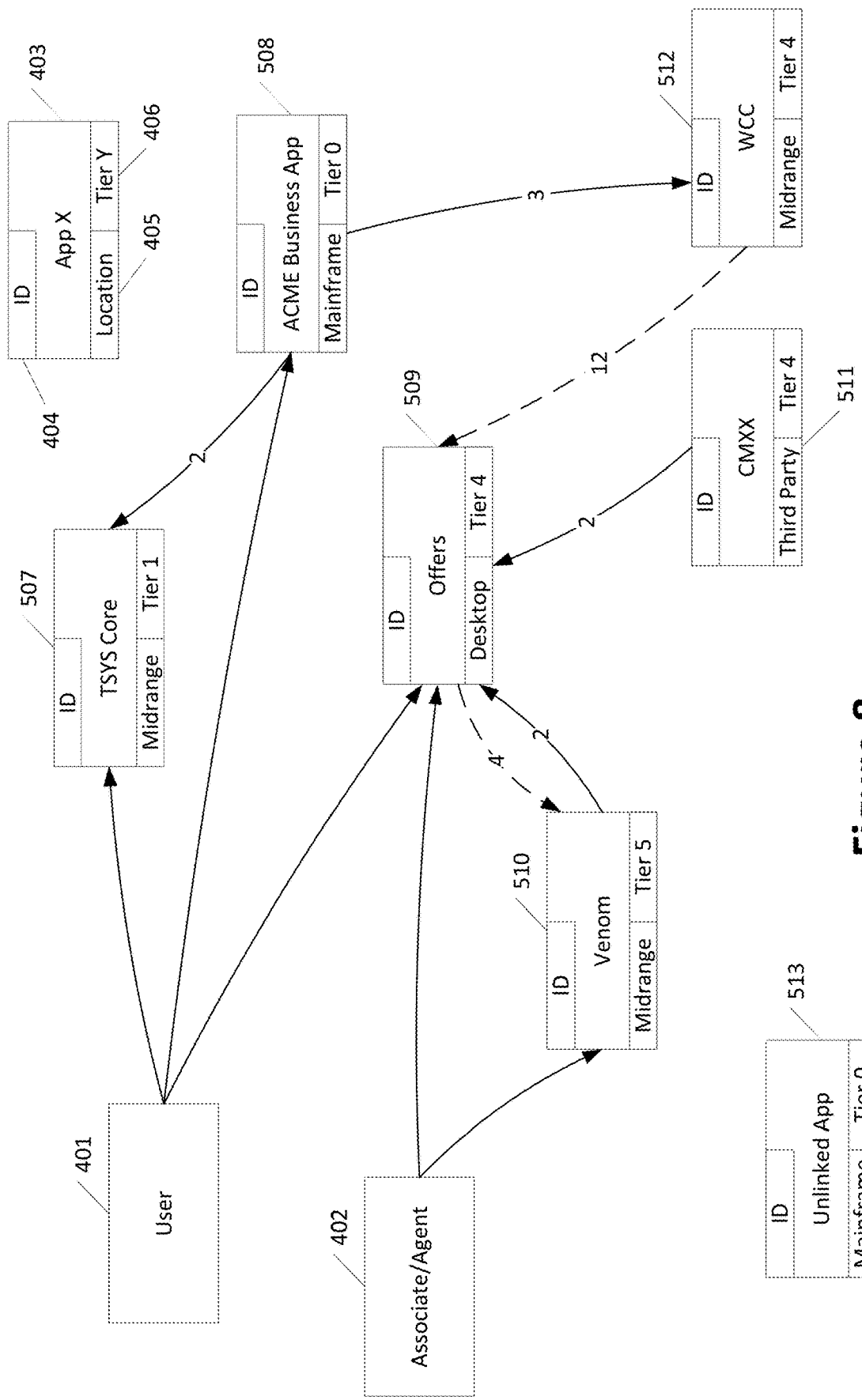
FIG. 8 illustrates a dependency diagram showing all dependencies between applications and users in accordance with various aspects of the disclosure.

FIG. 8 illustrates a dependency diagram showing all dependencies between applications and users in accordance with various aspects of the disclosure. In an embodiment, FIG. 8 may be displayed in area 310 of user interface feature selection background 301 (shown in FIG. 3). As discussed with respect to FIG. 3, user interface controls may be displayed on the left side of user interface feature selection background 301 and used to modify the displayed dependency diagram. FIG. 8 also illustrates that some applications may be standalone applications having no dependencies such as unlinked application template 513. Such applications may still be shown on dependency diagrams as they are still applications included in the selected service. In another embodiment, an application that does not display any dependencies may indicate that a data flow problem exists.

Figure 9:
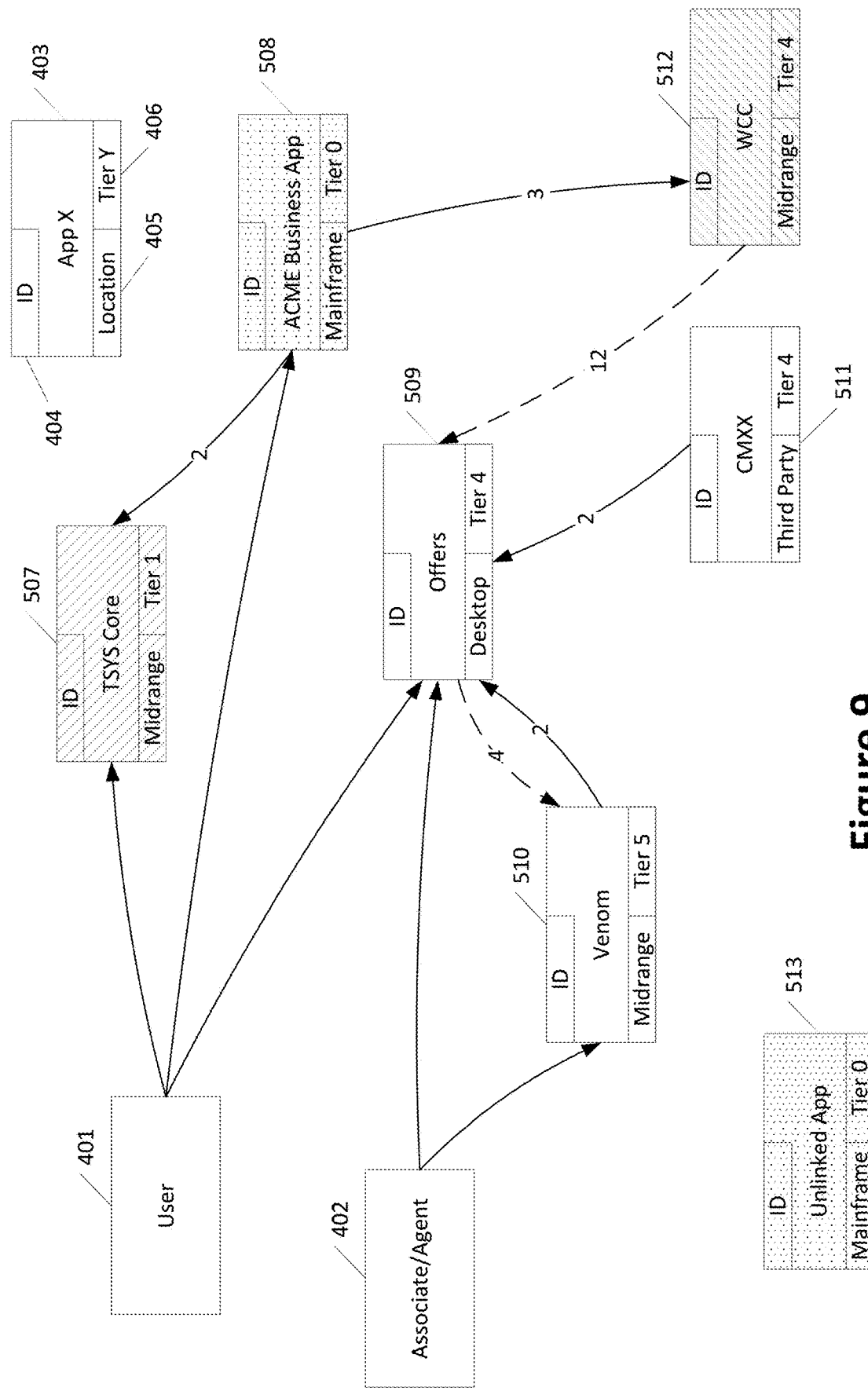
FIG. 9 illustrates using styles and colors to highlight features of application dependency diagrams in accordance with various aspects of the disclosure.

FIG. 9 illustrates using styles and colors to highlight features of similar applications in accordance with various aspects of the disclosure. For instance, FIG. 9 illustrates recovery Tier 0 applications 508 and 513 having a highlighted colored background. This may allow a user to quickly identify all critical applications. Similarly, all midrange applications such as applications 507 and 512 may be highlighted for easy identification. Those skilled in the art will realize that important similar features of application may be highlighted based on enterprise preferences.

In some aspects of the disclosure, detector probes may be configured and initiated to identify application flows between applications. The detector probes may be configured according to a computing environment in which the application executes and/or in which the detector probes are deployed. The detector probes may be configured to execute in a Java runtime environment, a mainframe computing system environment, or any combination of types of computing systems, operating systems, computing networks, or database systems, for example.

In an embodiment, a machine learning algorithm may analyze application flows to determine application dependencies in accordance with an aspect of the disclosure. Machine learning may be performed based on one or more dependencies diagrams with data input into the dependency diagram by one or more detector probes.

In an embodiment, the machine learning algorithm may incorporate user feedback regarding the determined application dependencies and mapped dependency diagrams. Results from the machine learning may be used to update the dependency mapping for improved accuracy in determining application dependencies.

In an embodiment, an application dependency database may store all determined application dependency diagrams. The application dependency database may be updated for any or each completed iteration of dependency application determination.

In another aspect of the disclosure, application dependency diagrams may be compared to each other for different selected services. The compared application dependency diagrams may be analyzed to determine how and where to combine different services. In an embodiment, a compatibility score may be generated and utilized in combing a first application service with a second application service. The analysis may provide insights into utilization of different application and method for improving application speed of execution within services.

Figure 10:
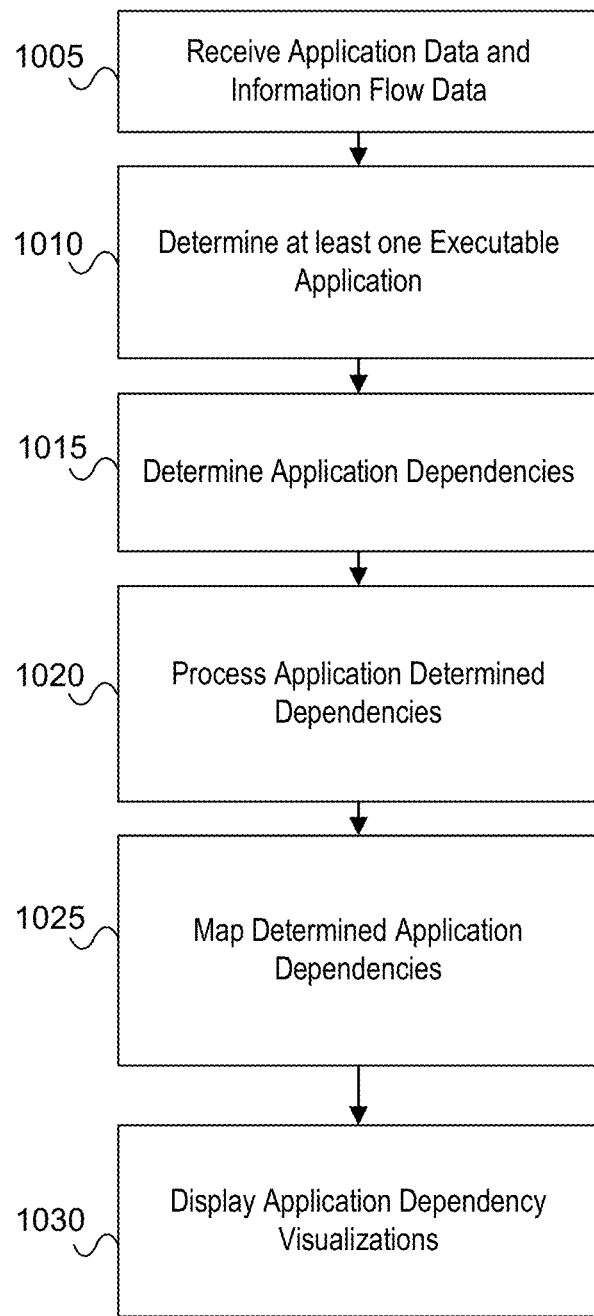
FIG. 10 illustrates a method of determining application dependencies in accordance with various aspects of the disclosure.

FIG. 10 depicts a process flow for generating application dependency diagrams in accordance with one or more example arrangements. In FIG. 10 at step 1005, the application dependency mapping platform 105 may receive application data and information flow data for an application service. In step 1010, application dependency mapping platform 105 may determine at least one executable application included in the application service based on the received data and information flow data. Next, in step 1015, application dependency mapping platform 105 may determine dependencies based on the analyzed application data and information flow data for the determined at least one executable application. In step 1020, application dependency mapping platform 105 may process the determined dependencies into a JSON data structure. Application dependency mapping platform 105 may in step 1025 map the determined application dependencies using a graphical library. In step 1030, application dependency mapping platform 105 may display the application dependency visualizations on a user interface of a display device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various examples. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware example, an entirely software example, an entirely firmware example, or an example combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative examples thereof. Numerous other examples, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method for mapping application dependencies in a computing environment comprising:

receiving, by an application dependency mapping platform from one or more computing devices executing an application service, application data and information flow data for the application service during runtime execution;

monitoring, by the application dependency mapping platform via detector probes deployed in the computing environment, process flows and data flows of the application service during runtime execution to generate the application data and information flow data;

determining, by the application dependency mapping platform based on the application data and information flow data, at least one executable application included in the application service;

determining, by the application dependency mapping platform based on the application data and information flow data, application dependencies among the at least one executable application by analyzing the monitored process flows and data flows;

processing, by the application dependency mapping platform, the application dependencies into a JavaScript Object Notation (JSON) data structure;

mapping, by the application dependency mapping platform using a graphical library, the application dependencies to generate a dependency visualization map;

rendering, by the application dependency mapping platform, a webpage frame including visual representations of the dependency visualization map;

displaying, by the application dependency mapping platform via a user interface of a display device, the webpage frame;

receiving, by the application dependency mapping platform from the user interface, a selection of the application service to initiate the monitoring;

configuring, by the application dependency mapping platform, the webpage frame to include diagram controls for operating features of the webpage frame;

configuring, by the application dependency mapping platform, the webpage frame to include visualization controls for displaying different features of the visual representations;

removing, by the application dependency mapping platform responsive to a user input via the visualization controls, batch processes from the visual representations in the webpage frame;

reorganizing, by the application dependency mapping platform responsive to a user input via the diagram controls, the visual representations of the application dependencies in the webpage frame on the display device;

analyzing, by the application dependency mapping platform using a machine learning algorithm, the monitored process flows and data flows to refine the application dependencies;

updating, by the application dependency mapping platform based on the analyzing by the machine learning algorithm, the dependency visualization map in real-time;

storing, by the application dependency mapping platform in an application dependency database, the dependency visualization map;

comparing, by the application dependency mapping platform, the dependency visualization map with a second dependency visualization map of a second application service;

generating, by the application dependency mapping platform based on the comparing, a compatibility score for combining the application service with the second application service; and modifying, by the application dependency mapping platform based on the compatibility score, the application service to improve execution speed by integrating the second application service.

2. The method of claim 1 further comprising configuring, by the application dependency mapping platform, the detector probes to execute in a JavaScript runtime environment within the computing environment.

3. The method of claim 2 further comprising receiving, by the application dependency mapping platform via the user interface, user feedback on the dependency visualization map.

4. The method of claim 3 further comprising incorporating, by the application dependency mapping platform, the user feedback into the machine learning algorithm to further refine the application dependencies.

5. The method of claim 4 further comprising annotating, by the application dependency mapping platform responsive to a user input via the diagram controls, the visual representations in the webpage frame with metadata including an asset identification number.

6. The method of claim 5 further comprising highlighting, by the application dependency mapping platform responsive to a user input via the visualization controls, critical applications in the visual representations based on a recovery tier status.

7. The method of claim 6 further comprising identifying, by the application dependency mapping platform based on the application dependencies, application loops between the at least one executable application and other applications.

8. The method of claim 7 further comprising hiding, by the application dependency mapping platform responsive to a user input via the visualization controls, the application loops from the visual representations to improve readability.

9. The method of claim 8 further comprising extracting, by the application dependency mapping platform from enterprise database systems, additional application data related to the application service.

10. The method of claim 9 further comprising generating, by the application dependency mapping platform based on the additional application data, an updated JSON data structure incorporating the additional application data.

11. A method for mapping application dependencies in a computing environment comprising:

receiving, by an application dependency mapping platform from one or more computing devices executing an application service within a private network, application data and information flow data for the application service during runtime execution;

monitoring, by the application dependency mapping platform via detector probes deployed across the one or more computing devices in the computing environment, process flows and data flows of the application service during runtime execution to generate the application data and information flow data;

determining, by the application dependency mapping platform based on the application data and information flow data, at least one executable application included in the application service;

determining, by the application dependency mapping platform based on the application data and information flow data, application dependencies among the at least one executable application by analyzing the monitored process flows and data flows;

processing, by the application dependency mapping platform, the application dependencies into a JavaScript Object Notation (JSON) data structure;

mapping, by the application dependency mapping platform using a graphical library executed on a host processor, the application dependencies to generate a dependency visualization map representing interconnections between application components and infrastructure components;

rendering, by the application dependency mapping platform, a webpage frame including visual representations of the dependency visualization map;

displaying, by the application dependency mapping platform via a user interface of a display device communicatively coupled to the private network, the webpage frame;

receiving, by the application dependency mapping platform from the user interface, a selection of the application service to initiate the monitoring;

configuring, by the application dependency mapping platform, the webpage frame to include diagram controls for operating features of the webpage frame, the diagram controls including a reload application feature and an add application feature;

configuring, by the application dependency mapping platform, the webpage frame to include visualization controls for displaying different features of the visual representations, the visualization controls including options to display only batch applications or only online applications;

removing, by the application dependency mapping platform responsive to a user input via the visualization controls, batch processes from the visual representations in the webpage frame;

reorganizing, by the application dependency mapping platform responsive to a user input via the diagram controls, the visual representations of the application dependencies in the webpage frame on the display device;

analyzing, by the application dependency mapping platform using a machine learning algorithm stored in a memory of the application dependency mapping platform, the monitored process flows and data flows to refine the application dependencies;

updating, by the application dependency mapping platform based on the analyzing by the machine learning algorithm, the dependency visualization map in realtime to reflect changes in the application dependencies;

storing, by the application dependency mapping platform in an application dependency database communicatively coupled to the private network, the dependency visualization map;

comparing, by the application dependency mapping platform, the dependency visualization map with a second dependency visualization map of a second application service executed on the one or more computing devices;

generating, by the application dependency mapping platform based on the comparing, a compatibility score for combining the application service with the second application service;

modifying, by the application dependency mapping platform based on the compatibility score, the application service to improve execution speed by integrating the second application service into the computing environment;

configuring, by the application dependency mapping platform, the detector probes to execute in a JavaScript runtime environment within the computing environment;

receiving, by the application dependency mapping platform via the user interface, user feedback on the dependency visualization map;

incorporating, by the application dependency mapping platform, the user feedback into the machine learning algorithm to further refine the application dependencies;

annotating, by the application dependency mapping platform responsive to a user input via the diagram controls, the visual representations in the webpage frame with metadata including an asset identification number and a platform type;

highlighting, by the application dependency mapping platform responsive to a user input via the visualization controls, critical applications in the visual representations based on a recovery tier status ranging from Tier 0 to Tier 5;

identifying, by the application dependency mapping platform based on the application dependencies, application loops between the at least one executable application and other applications within the application service;

hiding, by the application dependency mapping platform responsive to a user input via the visualization controls, the application loops from the visual representations to improve readability of the dependency visualization map;

extracting, by the application dependency mapping platform from enterprise database systems within the private network, additional application data related to the application service, the additional application data including service enablers and server dependencies;

generating, by the application dependency mapping platform based on the additional application data, an updated JSON data structure incorporating the additional application data;

executing, by the application dependency mapping platform via the detector probes, runtime monitoring distinct from parsing communication logs to capture dynamic process interactions not recorded in static logs;

refining, by the application dependency mapping platform using the machine learning algorithm, the application dependencies based on the dynamic process interactions to distinguish from static dependency mapping;

optimizing, by the application dependency mapping platform based on the refined application dependencies, resource allocation in the computing environment to enhance scalability beyond manual visualization techniques;

associating, by the application dependency mapping platform, each of the at least one executable application with an application template including the asset identification number, the platform type, and the recovery tier status;

tracking, by the application dependency mapping platform using the asset identification number, the at least one executable application across the private network;

adjusting, by the application dependency mapping platform based on the refined application dependencies, the visual representations to display interconnections between users and the at least one executable application; and synchronizing, by the application dependency mapping platform via a communication interface, the dependency visualization map with a storage device in the private network to maintain real-time consistency across the computing environment.

12. A computing platform for mapping application dependencies in a computing environment comprising:
   at least one host processor configured to execute computer-readable instructions;
   a communication interface communicatively coupled to the at least one host processor configured to transmit and receive data across a private network;
   a memory storing computer-readable instructions that, when executed by the at least one host processor, cause the computing platform to:
   receive, from one or more computing devices executing an application service, application data and information flow data for the application service during runtime execution;
   monitor, via detector probes deployed in the computing environment, process flows and data flows of the application service during runtime execution to generate the application data and information flow data;
   determine, based on the application data and information flow data, at least one executable application included in the application service;
   determine, based on the application data and information flow data, application dependencies among the at least one executable application by analyzing the monitored process flows and data flows;
   process the application dependencies into a JavaScript Object Notation (JSON) data structure;
   map, using a graphical library, the application dependencies to generate a dependency visualization map;
   render a webpage frame including visual representations of the dependency visualization map;
   display, via a user interface of a display device, the webpage frame;
   receive, from the user interface, a selection of the application service to initiate the monitoring;
   configure the webpage frame to include diagram controls for operating features of the webpage frame;
   configure the webpage frame to include visualization controls for displaying different features of the visual representations;
   remove, responsive to a user input via the visualization controls, batch processes from the visual representations in the webpage frame;
   reorganize, responsive to a user input via the diagram controls, the visual representations of the application dependencies in the webpage frame on the display device;
   analyze, using a machine learning algorithm, the monitored process flows and data flows to refine the application dependencies;
   update, based on the analyzing by the machine learning algorithm, the dependency visualization map in real-time;
   storing, in an application dependency database, the dependency visualization map;
   comparing the dependency visualization map with a second dependency visualization map of a second application service;
   generating, based on the comparing, a compatibility score for combining the application service with the second application service; and
   modifying, based on the compatibility score, the application service to improve execution speed by integrating the second application service.

13. The computing platform of claim 12 wherein the memory further stores computer-readable instructions that, when executed by the at least one host processor, cause the computing platform to configure the detector probes to execute in a JavaScript runtime environment within the computing environment.

14. The computing platform of claim 13 wherein the memory further stores computer-readable instructions that, when executed by the at least one host processor, cause the computing platform to receive, via the user interface, user feedback on the dependency visualization map.

15. The computing platform of claim 14 wherein the memory further stores computer-readable instructions that, when executed by the at least one host processor, cause the computing platform to incorporate the user feedback into the machine learning algorithm to further refine the application dependencies.

16. The computing platform of claim 15 wherein the memory further stores computer-readable instructions that, when executed by the at least one host processor, cause the computing platform to annotate, responsive to a user input via the diagram controls, the visual representations in the webpage frame with metadata including an asset identification number.

17. The computing platform of claim 16 wherein the memory further stores computer-readable instructions that, when executed by the at least one host processor, cause the computing platform to highlight, responsive to a user input via the visualization controls, critical applications in the visual representations based on a recovery tier status.

18. The computing platform of claim 17 wherein the memory further stores computer-readable instructions that, when executed by the at least one host processor, cause the computing platform to identify, based on the application dependencies, application loops between the at least one executable application and other applications.

19. The computing platform of claim 18 wherein the memory further stores computer-readable instructions that, when executed by the at least one host processor, cause the computing platform to hide, responsive to a user input via the visualization controls, the application loops from the visual representations to improve readability.

20. The computing platform of claim 19 wherein the memory further stores computer-readable instructions that, when executed by the at least one host processor, cause the computing platform to store the dependency visualization map in the application dependency database communicatively coupled to the private network.

21. A computing platform for mapping application dependencies in a computing environment comprising:
   at least one host processor configured to execute computer-readable instructions;
   a communication interface communicatively coupled to the at least one host processor configured to transmit and receive data across a private network;
   a memory storing computer-readable instructions that, when executed by the at least one host processor, cause the computing platform to:
   receive, from one or more computing devices executing an application service within the private network, application data and information flow data for the application service during runtime execution;
   monitor, via detector probes deployed across the one or more computing devices in the computing environment, process flows and data flows of the application service during runtime execution to generate the application data and information flow data;

determine, based on the application data and information flow data, at least one executable application included in the application service;

determine, based on the application data and information flow data, application dependencies among the at least one executable application by analyzing the monitored process flows and data flows;

process the application dependencies into a JavaScript Object Notation (JSON) data structure;

map, using a graphical library executed on the at least one host processor, the application dependencies to generate a dependency visualization map representing interconnections between application components and infrastructure components;

render a webpage frame including visual representations of the dependency visualization map;

display, via a user interface of a display device communicatively coupled to the private network, the webpage frame;

receive, from the user interface, a selection of the application service to initiate the monitoring;

configure the webpage frame to include diagram controls for operating features of the webpage frame, the diagram controls including a reload application feature and an add application feature;

configure the webpage frame to include visualization controls for displaying different features of the visual representations, the visualization controls including options to display only batch applications or only online applications;

remove, responsive to a user input via the visualization controls, batch processes from the visual representations in the webpage frame;

reorganize, responsive to a user input via the diagram controls, the visual representations of the application dependencies in the webpage frame on the display device;

analyze, using a machine learning algorithm stored in the memory, the monitored process flows and data flows to refine the application dependencies;

update, based on the analyzing by the machine learning algorithm, the dependency visualization map in real-time to reflect changes in the application dependencies;

configure the detector probes to execute in a JavaScript runtime environment within the computing environment;

receive, via the user interface, user feedback on the dependency visualization map;

incorporate the user feedback into the machine learning algorithm to further refine the application dependencies;

annotate, responsive to a user input via the diagram controls, the visual representations in the webpage frame with metadata including an asset identification number and a platform type;

highlight, responsive to a user input via the visualization controls, critical applications in the visual representations based on a recovery tier status ranging from Tier 0 to Tier 5;

identify, based on the application dependencies, application loops between the at least one executable application and other applications within the application service;

hide, responsive to a user input via the visualization controls, the application loops from the visual representations to improve readability of the dependency visualization map;

store the dependency visualization map in an application dependency database communicatively coupled to the private network;

compare the dependency visualization map with a second dependency visualization map of a second application service executed on the one or more computing devices;

generate, based on the comparing, a compatibility score for combining the application service with the second application service;

modify, based on the compatibility score, the application service to improve execution speed by integrating the second application service into the computing environment;

extract, from enterprise database systems within the private network, additional application data related to the application service, the additional application data including service enablers and server dependencies;

generate, based on the additional application data, an updated JSON data structure incorporating the additional application data;

execute, via the detector probes, runtime monitoring distinct from parsing communication logs to capture dynamic process interactions not recorded in static logs;

refine, using the machine learning algorithm, the application dependencies based on the dynamic process interactions to distinguish from static dependency mapping;

optimize, based on the refined application dependencies, resource allocation in the computing environment to enhance scalability beyond manual visualization techniques;

associate each of the at least one executable application with an application template including the asset identification number, the platform type, and the recovery tier status;

track, using the asset identification number, the at least one executable application across the private network;

adjust, based on the refined application dependencies, the visual representations to display interconnections between users and the at least one executable application; and synchronize, via the communication interface, the dependency visualization map with a storage device in the private network to maintain real-time consistency across the computing environment.

* * * * *